(12) United States Patent
Park et al.

(10) Patent No.: US 8,672,497 B2
(45) Date of Patent: Mar. 18, 2014

(54) PHOSPHOR PLATE AND LIGHTING DEVICE

(75) Inventors: Jong Chan Park, Seoul (KR); Young Jin Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 105 days.

(21) Appl. No.: 13/304,527

(22) Filed: Nov. 25, 2011

(65) Prior Publication Data

US 2012/0134132 A1 May 31, 2012

(30) Foreign Application Priority Data

| Nov. 26, 2010 | (KR) | 10-2010-0118921 |
| Nov. 26, 2010 | (KR) | 10-2010-0118922 |
| Nov. 26, 2010 | (KR) | 10-2010-0118923 |
| Nov. 26, 2010 | (KR) | 10-2010-0118925 |

(51) Int. Cl.
F21V 9/16 (2006.01)

(52) U.S. Cl.
USPC .............. 362/84; 362/293; 362/333

(58) Field of Classification Search
USPC ............ 362/84, 231, 618, 97.3, 333, 249.02, 362/293; 349/71; 438/29; 257/98
See application file for complete search history.

(56) References Cited

U.S. PATENT DOCUMENTS

| 5,117,234 | A  | * | 5/1992  | Shizawa .................... 341/143 |
| 7,294,861 | B2 | * | 11/2007 | Schardt et al. ............... 257/81 |
| 7,819,539 | B2 | * | 10/2010 | Kim et al. .................... 362/84 |
| 7,915,627 | B2 | * | 3/2011  | Li ............................... 257/98 |
| 7,935,978 | B2 | * | 5/2011  | Mitsuishi et al. ............. 257/98 |
| 2006/0268579 | A1 | * | 11/2006 | Han et al. ..................... 362/629 |
| 2007/0230170 | A1 | * | 10/2007 | Mita et al. .................... 362/231 |
| 2009/0147497 | A1 | * | 6/2009  | Nada ............................ 362/84 |

* cited by examiner

*Primary Examiner* — Peggy A. Neils
(74) *Attorney, Agent, or Firm* — Birch, Stewart, Kolasch & Birch, LLP

(57) ABSTRACT

A phosphor plate may be provided that includes a base plate transmitting light; and a lens being disposed on at least one of both surfaces of the base plate and including a fluorescent material.

20 Claims, 7 Drawing Sheets

US 8,672,497 B2

PHOSPHOR PLATE AND LIGHTING DEVICE

CROSS-REFERENCE TO RELATED APPLICATION

The present application claims priority under 35 U.S.C. §119(e) of Korean Patent Applications Nos. 10-2010-0118921 filed Nov. 26, 2010, 10-2010-0118922 filed Nov. 26, 2010, 10-2010-0118923 filed Nov. 26, 2010, 10-2010-0118925 filed Nov. 26, 2010, the subject matters of which are incorporated herein by reference.

BACKGROUND

1. Field

Embodiments may relate to a phosphor plate and lighting device.

2. Background

A light emitting diode (LED) is an energy device for converting electric energy into light energy. Compared with an electric bulb, the LED has higher conversion efficiency, lower power consumption and a longer life span. As there advantages are widely known, more and more attentions are now paid to a lighting apparatus using the LED.

The lighting apparatus using the LED are generally classified into a direct lighting apparatus and an indirect lighting apparatus. The direct lighting apparatus emits light emitted from the LED without changing the path of the light. The indirect lighting apparatus emits light emitted from the LED by changing the path of the light through reflecting means and so on. Compared with the direct lighting apparatus, the indirect lighting apparatus mitigates to some degree the intensified light emitted from the LED and protects the eyes of users.

SUMMARY

One embodiment is a phosphor plate. The phosphor plate includes: a base plate transmitting light; and a lens being disposed on at least one of both surfaces of the base plate and including a fluorescent material.

Another embodiment is a lighting device. The lighting device includes: a case including a recess; a light emitting module being disposed in the recess of the case and including at least one light emitting device; and a phosphor plate being disposed in the recess of the case and being disposed over the light emitting module. The phosphor plate includes a base plate transmitting light and a lens being disposed on at least one of both surfaces of the base plate and including a fluorescent material.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

Figure 1:
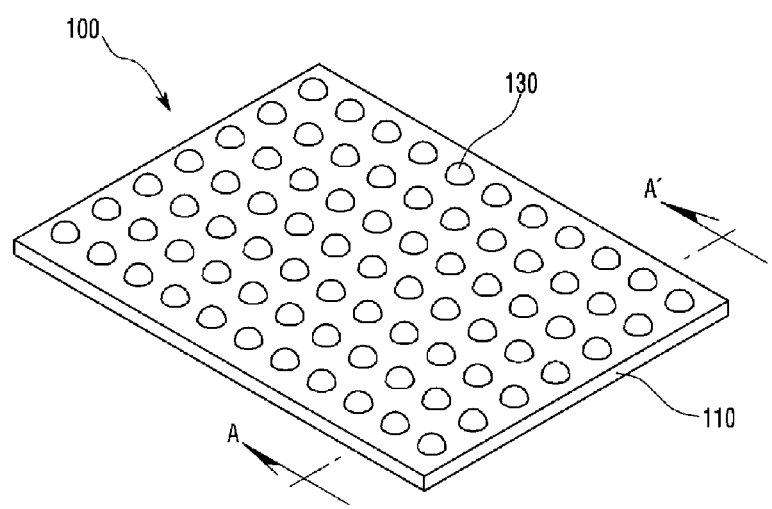
FIG. 1 is a perspective view of a phosphor plate according to a first embodiment.
Figure 2:
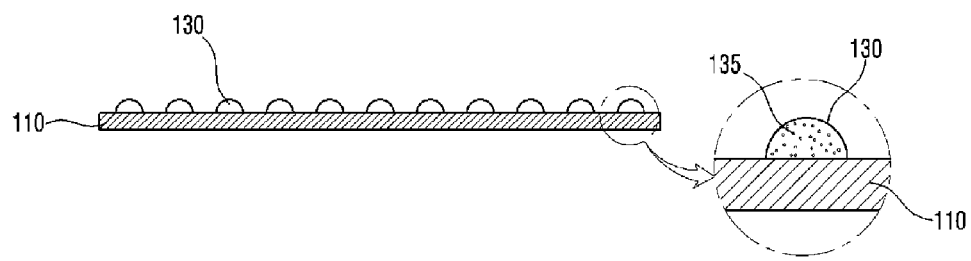
FIG. 2 is a cross sectional view of the phosphor plate shown in FIG. 1 taken along a line A-A'.

FIG. 1 is a perspective view of a phosphor plate according to a first embodiment. FIG. 2 is a cross sectional view of the phosphor plate shown in FIG. 1 taken along a line A-A'.

Referring to FIGS. 1 to 2, when a phosphor plate 100 according to a first embodiment receives predetermined light incident from the outside, the phosphor plate 100 is able to emit excited light by the incident light. The phosphor plate 100 is also able to transmit the incident light as it is. The light emitted from the phosphor plate 100 may be created by adding the incident light and the excited light.

The phosphor plate 100 may include a base plate 110 and a plurality of lenses 130.

The base plate 110 may be a polymer plate capable of transmitting light. The base plate 110 may be, for example, any one selected from a group consisting of polycarbonate (PC), a light guide plate, polyethylene terephthalate (PET), polyethylene naphthalate (PEN), acrylic resin, polystyrene (PS), polymethyl methacrylate (PMMA) and the like. Here, when the base plate 110 is required to have thermal resistance and chemical resistance, it is recommended that the base plate 110 should be formed of polycarbonate (PC).

The base plate 110 is able to diffuse the light as well as transmits the light. For example, the base plate 110 may be a diffuser plate or a light transmitting substrate including a diffusing agent. Here, the diffusing agent may include, for example, at least any one of $SiO_2$, $TiO_2$, ZnO, $BaSO_4$, $CaSO_4$, $MgCO_3$, $Al(OH)_3$, synthetic silica, glass beads and diamond. However the diffusing agent is not limited to this. The size of the diffusing agent's particle may be determined suitable for the diffusion of the light. For example, the particle may have a diameter of 5 μm to 7 μm.

The lens 130 may be disposed on one surface of the base plate 110. Also, the lens 130 may project outwardly from the one surface of the base plate 110. In other words, when the lens 130 is attached to the base plate 110, the lens 130 may be disposed on the one surface of the base plate 110. When the lens 130 and the base plate 110 are integrally formed with each other, the lens 130 may project outwardly from the one surface of the base plate 110.

The lens 130 may have a hemispherical shape. However, the shape of the lens 130 is not limited to this. For example, the lens 130 may have various shapes such as a conical shape, a poly-pyramid shape, a cylindrical shape and a polygonal pillar shape and the like. In this specification, as shown in FIGS. 1 to 2, the hemispherical shape includes not only a geometrically perfect hemisphere but also a hemisphere having an irregular curvature.

The lens 130 may have an embossed shape. The lens 130 may also have an engraved shape as well.

The lens 130 may be formed of a plastic material. Specifically, the lens 130 may be formed of a resin. Here, the resin may be an UV resin which can be cured by ultraviolet (UV). The lens 130 may be any one of an acrylic resin, a silicone resin and a urethane resin as well as the UV resin.

The lens 130 may include at least one fluorescent material 135.

The fluorescent material 135 may be uniformly distributed and disposed within the lens 130.

The fluorescent material 135 is able to emit light excited by light incident from the outside.

The fluorescent material 135 may be at least any one of a silicate based material, a sulfide based material, a YAG based material, a TAG based material and a nitride based material. There is no limit to the kind of the fluorescent material.

The fluorescent material 135 may include at least one of yellow, red and green fluorescent materials which emit yellow, excited red and green lights. CaS:Eu which is a sulfide based inorganic fluorescent material is taken as an example of the red fluorescent material. SrS:Eu and MgS:Eu which are sulfide based inorganic fluorescent materials are taken as an example of the yellow fluorescent material. $SrGa_2S_4$:Eu and Eu2+ which are sulfide based inorganic fluorescent materials are taken as an example of the green fluorescent material.

The kind and amount of the fluorescent material 135 included in the lens 130 may be changed according to a light source. For example, when the light source is a white light source, the lens 130 may include the green and red fluorescent materials. When the light source is a blue light source, the lens 130 may include the green, yellow and red fluorescent materials.

The lens 130 may include at least one of a diffusing agent, an antifoaming agent, an additive and a curing agent.

The diffusing agent may scatter the light incident on the lens 130. The diffusing agent may include at least any one of $SiO_2$, $TiO_2$, ZnO, $BaSO_4$, $CaSO_4$, $MgCO_3$, $Al(OH)_3$, synthetic silica, glass beads and diamond.

The antifoaming agent is able to remove the foams within the lens 130 and to obtain reliability of the phosphor plate 100. The antifoaming agent may include, for example, octanol, cyclohexanol, ethylene glycol or various surfactants. However, the kind of the antifoaming agent is not limited to this.

The curing agent is able to stably cure the lens 130.

The additive is able to uniformly the fluorescent material 135 within the lens 130.

The phosphor plate 100 according to the first embodiment shown in FIGS. 1 to 2 may be a phosphor micro lens array (PMLA). In the phosphor plate 100 according to the first embodiment, the hemisphere-shaped lenses 130 having the fluorescent material 135 are arranged on the base plate 110 in the form of an array. Therefore, the phosphor plate 100 has high excitation efficiency and makes it easy to diffuse and disperse the light.

Figure 3:
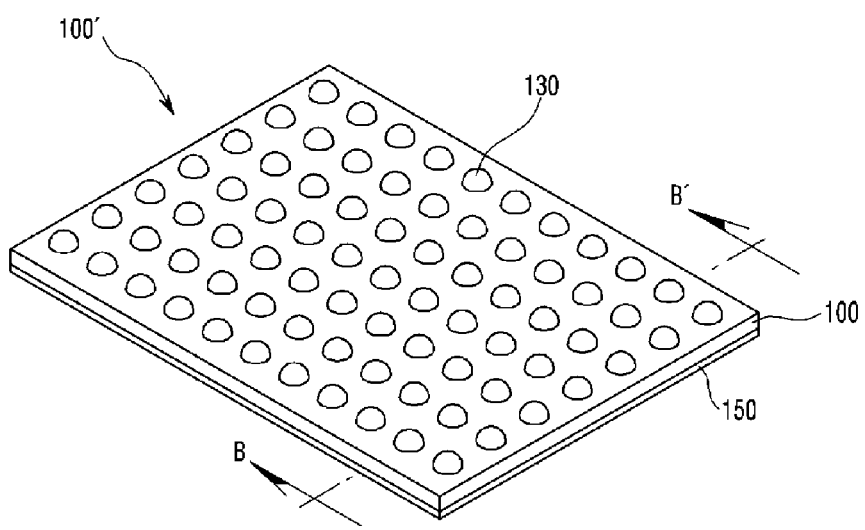
FIG. 3 is a perspective view of a phosphor plate according to a second embodiment.
Figure 4:
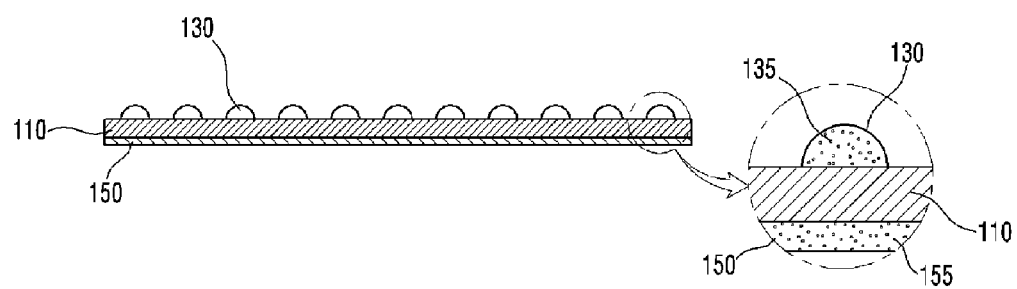
FIG. 4 is a cross sectional view of the phosphor plate shown in FIG. 3 taken along a line B-B'.

FIG. 3 is a perspective view of a phosphor plate according to a second embodiment. FIG. 4 is a cross sectional view of the phosphor plate shown in FIG. 3 taken along a line B-B'.

Referring to FIGS. 3 to 4, a phosphor plate 100' according to the second embodiment may be formed by adding a fluorescent layer 150 to the phosphor plate 100 according to the first embodiment shown in FIG. 1.

The fluorescent layer 150 may be disposed on the other surface of the base plate 110.

The fluorescent layer 150 may include a resin. Further, the fluorescent layer 150 may include a silicone resin.

The fluorescent layer 150 may includes a fluorescent material 155. For convenience of description, the fluorescent material 135 of the lens 130 is designated as a first fluorescent material. The fluorescent material 155 of the fluorescent layer 150 is a designated as a second fluorescent material.

The second fluorescent material 155 may be uniformly distributed and disposed within the fluorescent layer 150.

The second fluorescent material 155 is able to emit light excited by light incident from the outside.

The second fluorescent material 155 may be the same as the first fluorescent material 135. Besides, the second fluorescent material 155 may be different from the first fluorescent material 135. For example, the first fluorescent material 135 may be a yellow fluorescent material and the second fluorescent material 155 may be a red fluorescent material. Here, when first fluorescent material 135 is a yellow fluorescent material and the second fluorescent material 155 is a red fluorescent material, the degree of dispersion of the fluorescent material can be enhanced. Specifically, when the yellow fluorescent material and the red fluorescent material are mixed with each other in any one of the lens 130 and the fluorescent layer 150, the yellow fluorescent material and the red fluorescent material are not appropriately dispersed due to the specific gravity difference between the yellow fluorescent material and the red fluorescent material. However, the phosphor plate 100' according to the second embodiment includes the lens 130 and the fluorescent layer 150 both of which have the mutually different fluorescent materials. Accordingly, it is possible to enhance the degree of dispersion of the fluorescent material.

The first fluorescent material 135 may further include a green fluorescent material. When the first fluorescent material 135 further includes the green fluorescent material, optical characteristic, for example, a color rendering index and the like can be improved. Here, since the specific gravities of the yellow fluorescent material and the green fluorescent material are different from each other, the yellow fluorescent material and the green fluorescent material may not be well mixed with each other. For the purpose of overcoming such a problem, the lens 130 may consists of a first layer including the yellow fluorescent material and a second layer including the green fluorescent material.

Like the lens 130, the fluorescent layer 150 may include at least one of a diffusing agent, an antifoaming agent, an additive and a curing agent.

Both when the plurality of the lenses 130 are disposed on the one surface of the base plate 110 and when the fluorescent layer 150 is disposed on the other surface of the base plate 110, the phosphor plate 100' can be prevented from being curved. When the phosphor plate 100 according to the first embodiment is installed over a light source and used, stress is generated in the phosphor plate 100 by heat from the light source, and the phosphor plate 100 may be curved by the stress. However, since the phosphor plate 100' according to the second embodiment includes the lens which is disposed on the one surface of the base plate 110 and the fluorescent layer 150 which is disposed on the other surface of the base plate 110, it is possible to prevent the phosphor plate 100' from being curved due to the heat from the light source.

The phosphor plate 100' according to the second embodiment shown in FIGS. 3 to 4 may be a phosphor micro lens array (PMLA). In the phosphor plate 100' according to the second embodiment, the plurality of the lenses 130 having the first fluorescent material 135 are disposed on the one surface of the base plate 110 in the form of an array. The fluorescent layer 150 having the fluorescent material 155 is disposed on the other surface of the base plate 110. Therefore, the phosphor plate 100' can be prevented from being curved due to the light source and the degree of dispersion of the fluorescent material is enhanced. Moreover, the phosphor plate 100' has the high excitation efficiency and improves luminous flux of light and a color rendering index. Also, uniformity characteristics of light can be enhanced.

Figure 5:
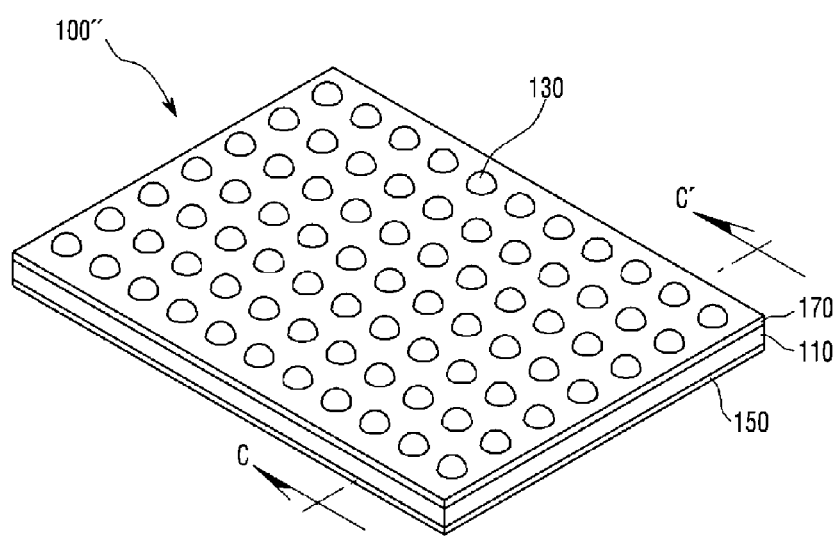
FIG. 5 is a perspective view of a phosphor plate according to a third embodiment.
Figure 6:
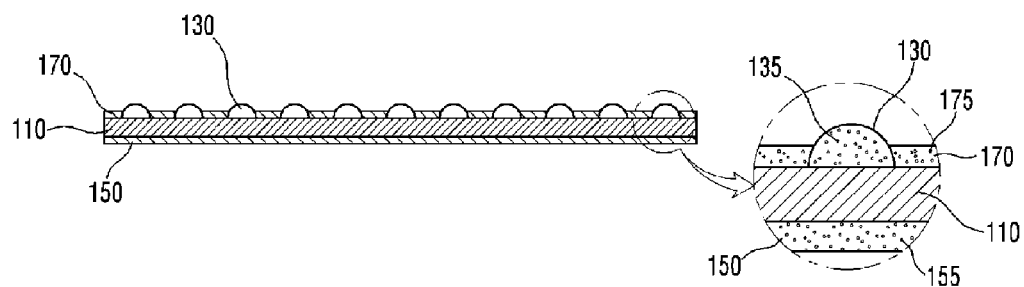
FIG. 6 is a cross sectional view of the phosphor plate shown in FIG. 5 taken along a line C-C'.

FIG. 5 is a perspective view of a phosphor plate according to a third embodiment. FIG. 6 is a cross sectional view of the phosphor plate shown in FIG. 5 taken along a line C-C'.

Referring to FIGS. 5 to 6, a phosphor plate 100" according to the third embodiment may be formed by adding a fluorescent layer 170 to the phosphor plate 100' according to the second embodiment shown in FIG. 3.

For convenience of description, the fluorescent layer 170 disposed on the one surface of the base plate 110 is designated as a first fluorescent layer 170. The fluorescent layer 150 disposed on the other surface of the base plate 110 is designated as a second fluorescent layer 150.

The first fluorescent layer 170, together with the lens 130, is disposed on the one surface of the base plate 110. Specifically, the first fluorescent layer 170 is disposed on the one surface of the base plate 110 in such a manner that the lens 130 is not completely buried. From another point of view, the first fluorescent layer 170 may be disposed between the plurality of the lenses 130.

The first fluorescent layer 170, like the second fluorescent layer 150, may include a resin. The first fluorescent layer 170 may include a silicone resin.

The first fluorescent layer 170 includes a fluorescent material 175. For convenience of description, the fluorescent material 175 of the first fluorescent layer 170 is designated as a third fluorescent material.

The third fluorescent material 175 may be uniformly distributed and disposed within the first fluorescent layer 170.

The third fluorescent material 175 is able to emit light excited by light incident from the outside.

The third fluorescent material 175 may be the same as the first and the second fluorescent materials 135 and 155. Besides, the third fluorescent material 175 may be different from the first and the second fluorescent materials 135 and 155. For example, the first fluorescent material 135 may be the yellow fluorescent material, the second fluorescent material 155 may be the red fluorescent material, and the third fluorescent material 175 may be the green fluorescent material. When the first fluorescent material 135 is the yellow fluorescent material, the second fluorescent material 155 is the red fluorescent material, and the third fluorescent material 175 is the green fluorescent material, the degree of dispersion of the fluorescent material can be enhanced. Specifically, when at least two of the yellow, red and green fluorescent materials are mixed with each other in any one of the lens 130 and the first and the second fluorescent layers 170 and 150, the fluorescent materials are not well dispersed due to the specific gravity difference among the yellow, red and green fluorescent materials. However, the phosphor plate 100" according to the third embodiment includes the lens 130 and the first and the second fluorescent layers 170 and 150, all of which have the mutually different fluorescent materials. Accordingly, it is possible to enhance the degree of dispersion of the fluorescent material. Also, when the first to the third fluorescent materials 135, 155 and 175 are different from each other, the phosphor plate 100" has high excitation efficiency.

Like the lens 130 or the first fluorescent layer 170, the second fluorescent layer 150 may include at least one of a diffusing agent, an antifoaming agent, an additive and a curing agent.

Both when the plurality of the lenses 130 and the first fluorescent layer 170 are disposed on the one surface of the base plate 110 and when the second fluorescent layer 150 is disposed on the other surface of the base plate 110, the phosphor plate 100" can be prevented from being curved due to a light source.

The phosphor plate 100" according to the third embodiment shown in FIGS. 5 to 6 may be a phosphor micro lens array (PMLA). In the phosphor plate 100" according to the third embodiment, the lens 130 includes the first fluorescent material 135, has a hemispherical shape and is disposed on the base plate 110 in the form of an array. The second fluorescent layer 150 including the second fluorescent material 155 is disposed on the other surface of the base plate 110. The first fluorescent layer 170 including the third fluorescent material 175 is disposed together with the lens 130 on the one surface of the base plate 110. Therefore, the phosphor plate 100" can be prevented from being curved due to the light source and the degree of dispersion of the fluorescent material is enhanced. Moreover, the phosphor plate 100" has the high excitation efficiency and improves luminous flux of light and a color rendering index. Also, uniformity characteristics of light can be enhanced.

Figure 7:
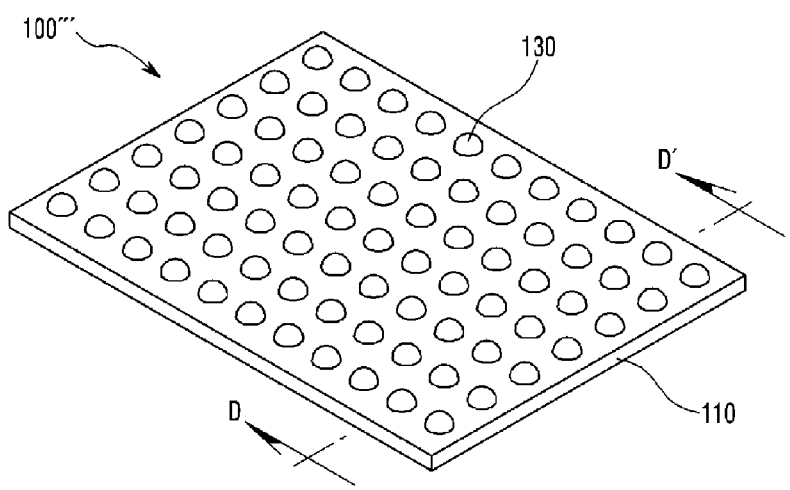
FIG. 7 is a perspective view of a phosphor plate according to a fourth embodiment.
Figure 8:
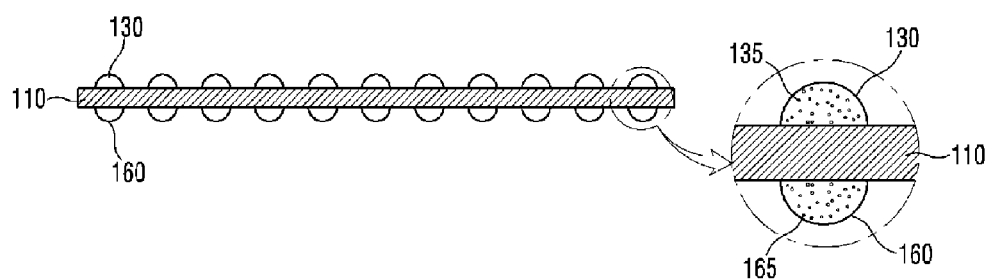
FIG. 8 is a cross sectional view of the phosphor plate shown in FIG. 7 taken along a line D-D'.

FIG. 7 is a perspective view of a phosphor plate according to a fourth embodiment. FIG. 8 is a cross sectional view of the phosphor plate shown in FIG. 7 taken along a line D-D'.

Referring to FIGS. 7 to 8, a phosphor plate 100'" according to the fourth embodiment may be formed by adding a lens 160 to the phosphor plate 100 according to the first embodiment shown in FIG. 1. For convenience of description, the lens 130 disposed on the one surface of the base plate 110 is designated as a first lens. The lens 160 disposed on the other surface of the base plate 110 is designated as a second lens.

The second lens 160 may be disposed on the other surface of the base plate 110 or may project outwardly from the other surface of the base plate 110.

The first lens 130 may be disposed corresponding to the second lens 160 with respect to the base plate 110. However, the first and the second lenses 130 and 160 may be disposed without being limited to this. In other words, the first and the second lenses 130 and 160 may be disposed not to correspond to each other, that is, may be disposed out of line with each other.

Like the first lens 130, the second lens 160 may have a hemispherical shape. However, the shape of the lens 160 is not limited to this. The second lens 160 may have various shapes such as a conical shape, a poly-pyramid shape, a cylindrical shape and a polygonal pillar shape and the like.

The second lens 160 may have an embossed shape. The second lens 160 may also have an engraved shape as well.

The shape of the second lens 160 may be the same as or different from the shape of the first lens 130.

The second lens 160 may be formed of a plastic material. Particularly, the second lens 160 may be formed of a resin among the plastic materials. The resin may be also an UV resin which can be cured by ultraviolet. The second lens 160 may be any one of an acrylic resin, a silicone resin and a urethane resin as well as the UV resin.

The second lens 160 may include a fluorescent material 165. For convenience of description, the fluorescent material 135 included in the first lens 130 is designated as a first fluorescent material. The fluorescent material 165 included in the second lens 160 is designated as a second fluorescent material.

The second fluorescent material 165 may be uniformly distributed and disposed within the second lens 160.

The second fluorescent material 165 is able to emit light excited by light incident from the outside.

The second fluorescent material 165 may be the same as the first fluorescent material 135. Besides, the second fluorescent material 165 may be different from the first fluorescent material 135. For example, the first fluorescent material 135 may be the yellow fluorescent material and the second fluorescent material 165 may be the red fluorescent material. When first fluorescent material 135 is the yellow fluorescent material and the second fluorescent material 165 is the red fluorescent material, the degree of dispersion of the fluorescent material can be enhanced. Specifically, when at least two of the yellow, red and green fluorescent materials are mixed with each other in any one of the first lens 130 and the second lens 160, the fluorescent materials are not well dispersed due to the specific gravity difference among the yellow, red and green fluorescent materials. However, the phosphor plate 100''' according to the fourth embodiment includes the first lens 130 and the second lens 160, both of which have the mutually different fluorescent materials. Accordingly, it is possible to enhance the degree of dispersion of the fluorescent material. Also, when the first to the second fluorescent materials 135 and 165 are different from each other, the phosphor plate 100''' has high excitation efficiency.

The first fluorescent material 135 or the second fluorescent material 165 may further include a green fluorescent material. When the first fluorescent material 135 or the second fluorescent material 165 further includes the green fluorescent material, optical characteristic, for example, a color rendering index and the like can be improved. In this case, since the specific gravities of the first and the second fluorescent materials 135 and 165 included in the first and the second lenses 130 and 160 are different from the specific gravity of the green fluorescent material, the fluorescent materials may not be well mixed with each other. For the purpose of overcoming such a problem, a description will be provided with reference to FIG. 9.

Figure 9:
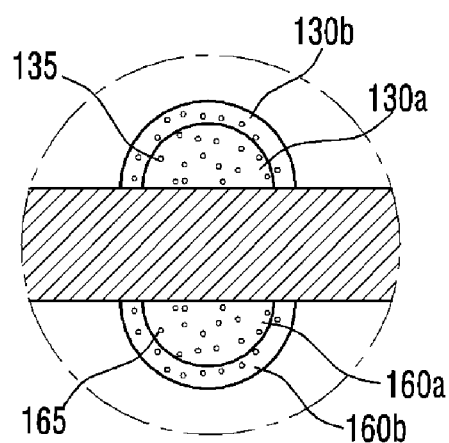
FIG. 9 is a cross sectional view showing a modified example of the phosphor plate shown in FIG. 8.

FIG. 9 is a cross sectional view showing a modified example of the phosphor plate shown in FIG. 8.

Referring to FIG. 9, the first lens 130 may consist of a first layer 130a including the first fluorescent material 135 and a second layer 130b including the green fluorescent material.

The second lens 160 may consist of a first layer 160a including the second fluorescent material 165 and a second layer 160b including the green fluorescent material.

Referring to again FIGS. 7 to 8, like the first lens 130, the second lens 160 may include at least one of a diffusing agent, an antifoaming agent, an additive and a curing agent.

Both when the first lens 130 is disposed on the one surface of the base plate 110 and when the second lens 160 is disposed on the other surface of the base plate 110, the phosphor plate 100''' can be prevented from being curved.

The phosphor plate 100''' according to the fourth embodiment shown in FIGS. 7 to 8 may be a phosphor micro lens array (PMLA). In the phosphor plate 100''' according to the fourth embodiment, the first lens 130 having the first fluorescent material 135 is disposed on the one surface of the base plate 110, and the second lens 160 having the second fluorescent material 165 is disposed on the other surface of the base plate 110. Therefore, the phosphor plate 100''' can be prevented from being curved due to the light source and the degree of dispersion of the fluorescent material is enhanced. Moreover, the phosphor plate 100''' has the high excitation efficiency and improves luminous flux of light and a color rendering index. Also, uniformity characteristics of light can be enhanced.

Figure 10:
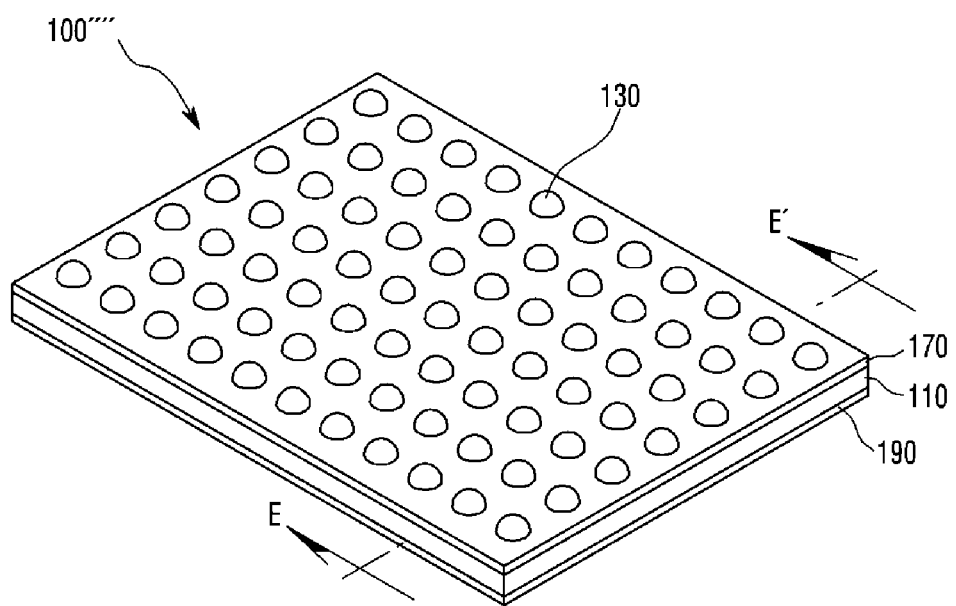
FIG. 10 is a perspective view of a phosphor plate according to a fifth embodiment.
Figure 11:
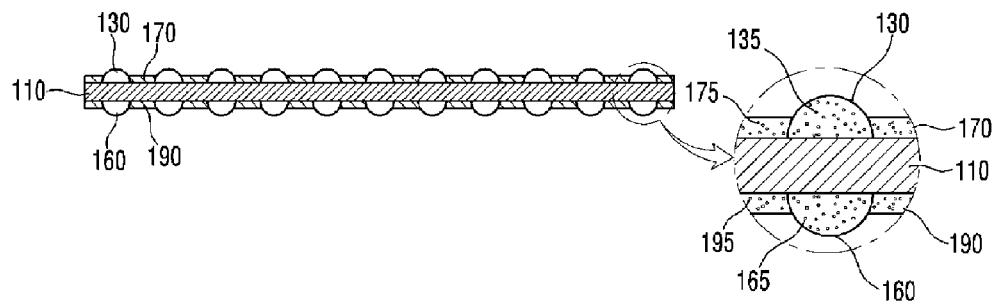
FIG. 11 is a cross sectional view of the phosphor plate shown in FIG. 10 taken along a line E-E'.

FIG. 10 is a perspective view of a phosphor plate according to a fifth embodiment. FIG. 11 is a cross sectional view of the phosphor plate shown in FIG. 10 taken along a line E-E'.

Referring to FIGS. 10 to 11, a phosphor plate 100'''' according to the fifth embodiment may be formed adding a first fluorescent layer 170 and a second fluorescent layer 190 to the phosphor plate 100''' according to the fourth embodiment shown in FIGS. 7 to 8.

The first fluorescent layer 170, together with the first lens 130, may be disposed on the one surface of the base plate 110. The second fluorescent layer 190, together with the second lens 160, may be disposed on the other surface of the base plate 110.

The first fluorescent layer 170 may be disposed to bury a portion of the first lens 130. The second fluorescent layer 190 may be disposed to bury a portion of the second lens 160.

The first fluorescent layer 170 may be disposed between the first lenses 130. The second fluorescent layer 190 may be disposed between the second lenses 160.

The first and the second fluorescent layers 170 and 190 may include a resin.

The first and the second fluorescent layers 170 and 190 include fluorescent materials 175 and 195 respectively. For convenience of description, the fluorescent material 175 included in the first fluorescent layer 170 is designated as a third fluorescent material. The fluorescent material 195 included in the second fluorescent layer 190 is designated as a fourth fluorescent material.

The third fluorescent material 175 may be uniformly distributed and disposed within the first fluorescent layer 170. The fourth fluorescent material 195 may be uniformly distributed and disposed within the second fluorescent layer 190.

The third and the fourth fluorescent materials 175 and 195 are able to emit light excited by light incident from the outside.

The third and the fourth fluorescent materials 175 and 195 may be the same as the first and the second fluorescent materials 135 and 165. Besides, the third and the fourth fluorescent materials 175 and 195 may be different from the first and the second fluorescent materials 135 and 165. For example, the third and the fourth fluorescent materials 175 and 195 may be the green fluorescent material. That is, the first fluorescent material 135 may be the yellow fluorescent material, the second fluorescent material 165 may be the red fluorescent material, and the third and the fourth fluorescent materials 175 and 195 may be the green fluorescent material. In this case, if the light source emits blue light, excitation efficiency can be improved. Also, the degree of dispersion of the fluorescent material can be enhanced.

Like the first and the second lenses 130 and 160, the first and second fluorescent layers 170 and 190 may include at least one of a diffusing agent, an antifoaming agent, an additive and a curing agent.

In the phosphor plate 100'''' according to the fifth embodiment shown in FIGS. 10 to 11, the first lens 130 and the first fluorescent layer 170 are disposed on the one surface of the base plate 110, and the second lens 160 and the second fluorescent layer 190 are disposed on the other surface of the base plate 110. Therefore, the phosphor plate 100'''' can be prevented from being curved due to the heat from the light source and the degree of dispersion of the fluorescent material is enhanced. Moreover, the phosphor plate 100'''' has the high excitation efficiency and improves luminous flux of light and a color rendering index. Also, uniformity characteristics of light can be enhanced.

FIGS. 12 to 15 are views for describing a method for manufacturing the phosphor plate according to the first embodiment shown in FIGS. 1 to 2.

Figure 12:
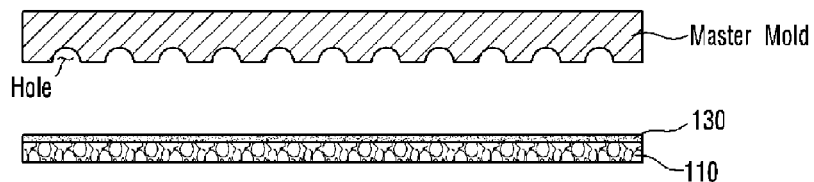
FIGS. 12 to 15 are views for describing a method for manufacturing the phosphor plate according to the first embodiment shown in FIGS. 1 to 2.

Referring to FIG. 12, a master mold having predetermined holes shown in FIG. 12 is provided. Here, the shape of the lens 130 depends on the shape of the hole.

The base plate 110 is provided and a lens layer 130 is formed on the base plate 110. Here, a lens layer 130 may include the fluorescent material 135 shown in FIG. 2. That is, the lens layer 130 may be formed by mixing a resin and the fluorescent material 135 and may be disposed on the base plate 110 in a liquid state.

Figure 13:
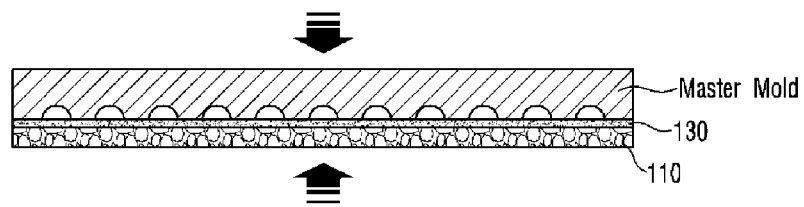

Referring to FIG. 13, the base plate 110 is moved in the direction of the master mold such that the lens layer 130 comes in direct contact with the master mold, and then a predetermined pressure is applied such that the master mold and the base plate 110 are pressed to each other. Accordingly, as shown in FIG. 14, the liquefied lens layer 130 is inserted into the holes of the master mold.

Figure 14:
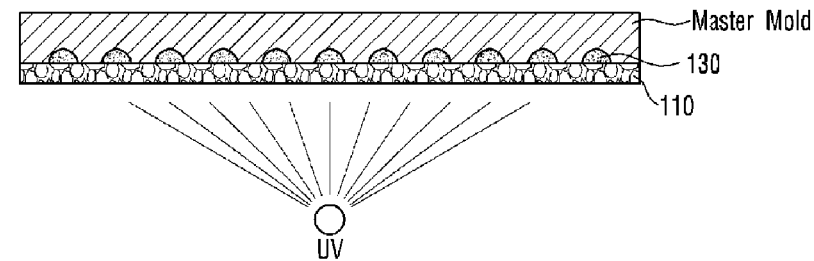

As shown in FIG. 14, the lens layer 130 is sufficiently cured by irradiating UV from an opposite side to the side on which the lens 130 is formed. The lens 130 can be formed by curing the lens layer 130.

Figure 15:
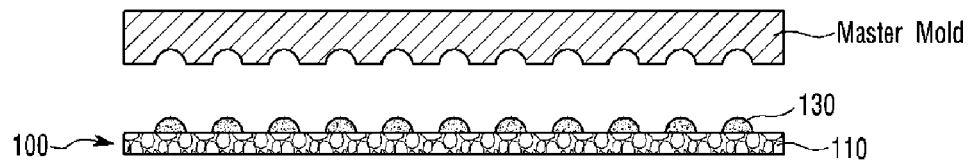

As shown in FIG. 15, the base plate 110 and the lens 130 are released from the master mold.

Through the manufacturing process shown in FIGS. 12 to 15, the phosphor plate 100 according to the first embodiment can be manufactured. Additionally, the phosphor plates 100', 100'', 100''' and 100'''' according to the second to the fifth embodiments shown in FIGS. 3 to 11 can be manufactured through the manufacturing process shown in FIGS. 12 to 15.

Figure 16:
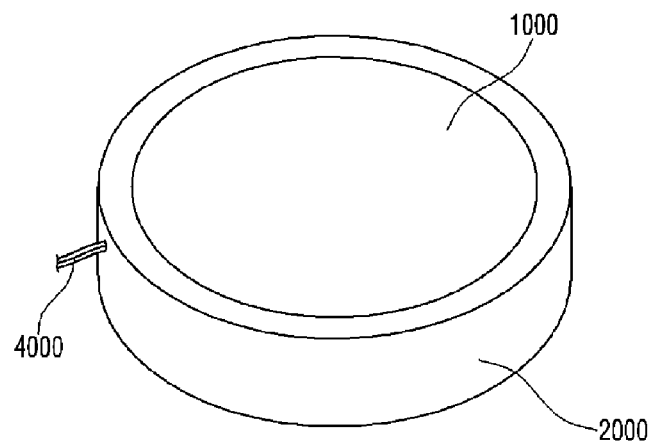
FIG. 16 is a perspective view of a lighting device according to the embodiment.
Figure 17:
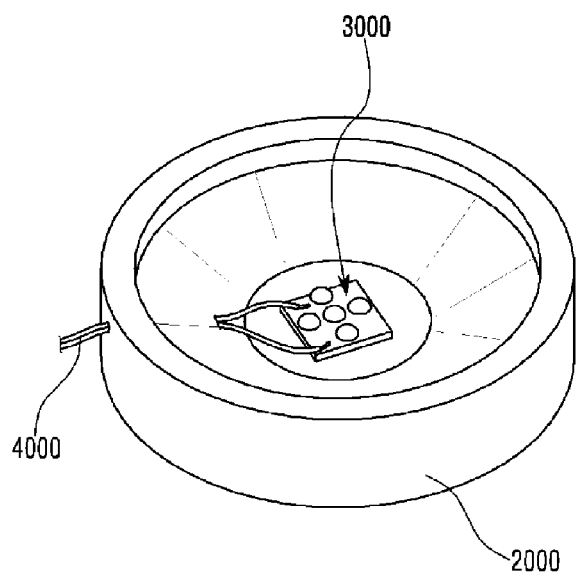
FIG. 17 is a perspective view of the lighting device without the phosphor shown in FIG. 16.

FIG. 16 is a perspective view of a lighting device according to the embodiment. FIG. 17 is a perspective view of the lighting device without the phosphor shown in FIG. 16.

Referring to FIGS. 16 to 17, the lighting device according to the embodiment may include a phosphor plate 1000, a case 2000 and a light emitting module 3000.

The phosphor plate 1000 may be the phosphor plate 100 according to the first embodiment shown in FIGS. 1 to 2 or may be any one among the phosphor plates 100', 100'', 100''' and 100'''' according to the second to the fifth embodiments shown in FIGS. 3 to 11.

The phosphor plate 1000 may be disposed over the light emitting module 3000, receive light emitted from the light emitting module 3000 and emit light excited by the received light.

The case 2000 is able to receive the phosphor plate 1000 and the light emitting module 3000. Specifically, the light emitting module 3000 may be disposed on the bottom surface of the recess of the case 2000. The phosphor plate 1000 may be disposed to cover the recess.

The case 2000 may receive heat generated from the light emitting module 3000 and radiate the heat. That is, the case 2000 can function as a heat sink. Therefore, the case 2000 may be formed of aluminum and an alloy including aluminum which have high thermal conductivity and excellent heat radiation efficiency.

The light emitting module 3000 may be disposed on the bottom surface of the recess of the case 2000. The light emitting module 3000 may include a light emitting device like a light emitting diode and a substrate on which a plurality of the light emitting devices are arranged.

The light emitting module 3000 may be disposed separately from the phosphor plate 1000 at a predetermined interval by the case 2000.

The lateral surface of the recess of the case 2000 may be a reflective surface capable of reflecting the light from the light emitting module 3000. Therefore, the lateral surface of the recess of the case 2000 is able to reflect the light emitted from the light emitting module 3000 to the phosphor plate 1000.

A wire 4000 passes through the case 2000 and is electrically connected to the light emitting module 3000. The wire 4000 is able to supply electric power to the light emitting module 3000 from an external power supply.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A phosphor plate comprising:
    a base plate transmitting light;
    a first lens disposed on one surface of the base plate and including a first fluorescent material;
    a first fluorescent layer in contact with the one surface of the base plate and including a second fluorescent material, which is different from the first fluorescent material; and
    a second fluorescent layer in contact with the other surface of the base plate and including a third fluorescent material, which is different from the first fluorescent material and the second fluorescent material,
    wherein the first fluorescent layer buries a portion of the first lens.

2. The phosphor plate of claim 1, wherein the first fluorescent material is a yellow fluorescent material and the second fluorescent material is a red fluorescent material or a green fluorescent material.

3. The phosphor plate of claim 2, wherein the amount of the yellow fluorescent material is more than that of the red fluorescent material or the green fluorescent material.

4. The phosphor plate of claim 1, wherein the first lens includes a first layer and a second layer, wherein the first layer and the second layer have fluorescent materials which are different each other.

5. A phosphor plate comprising:
a base plate transmitting light;
a fluorescent layer disposed on both surfaces of the base plate;
a first lens disposed on one surface of the base plate and including a first fluorescent material; and
a second lens disposed on the other surface of the base plate and including a second fluorescent material which is the same as or different from the first fluorescent material,
wherein the fluorescent layer comprises:
   a first fluorescent layer which is disposed on the one surface of the base plate, buries a portion of the first lens and includes a third fluorescent material; and
   a second fluorescent layer which is disposed on the other surface of the base plate, buries a portion of the second lens and includes a fourth fluorescent material,
   wherein the third and the fourth fluorescent materials are the same as or different from the first and the second fluorescent materials.

6. The phosphor plate of claim 5, wherein the first fluorescent material is a yellow fluorescent material, wherein the second fluorescent material is a red fluorescent material and the third and the fourth fluorescent materials are green fluorescent materials.

7. The phosphor plate of claim 6, wherein the amount of the yellow fluorescent material is more than that of the red fluorescent material.

8. The phosphor plate of claim 1, wherein the base plate comprises a diffusing agent which diffuses light and has a particle having a diameter from 5 μm to 7 μm.

9. The phosphor plate of claim 1, wherein the first lens has any one of a hemispherical shape, a conical shape, a polypyramid shape, a cylindrical shape and a polygonal pillar shape.

10. A lighting device comprising:
a case including a recess;
a light emitting module being disposed in the recess of the case and including at least one light emitting device; and
a phosphor plate being disposed in the recess of the case and being disposed over the light emitting module,
wherein the phosphor plate comprises:
   a base plate transmitting light;
   a first lens disposed on one surface of the base plate and including a first fluorescent material;
   a first fluorescent layer in contact with the one surface of the base plate and including a second fluorescent material which is different from the first fluorescent material; and
   a second fluorescent layer in contact with the other surface of the base plate and including a third fluorescent material which is different from the first fluorescent material and the second fluorescent material,
   wherein the first fluorescent layer buries a portion of the first lens.

11. The phosphor plate of claim 1, wherein the first lens and the base plate are integrally formed with each other.

12. The phosphor plate of claim 1, wherein a plurality of first lenses is provided, and wherein the first lenses of the plurality of first lenses are uniformly arranged.

13. The phosphor plate of claim 1, further comprising a second lens disposed on the other surface of the base plate and including a fourth fluorescent material, wherein the second fluorescent layer buries the second lens.

14. The phosphor plate of claim 1, wherein a maximum height of the first lens is greater than a maximum thickness of the first fluorescent layer.

15. The phosphor plate of claim 1, wherein a maximum thickness of the second fluorescent layer is greater than a maximum thickness of the first fluorescent layer.

16. The phosphor plate of claim 5, wherein the base plate, the first lens, and the second lens are integrally formed with each other.

17. The phosphor plate of claim 5, wherein a plurality of first lenses is provided, wherein the first lenses of the plurality of first lenses are uniformly arranged, wherein a plurality of second lenses is provided, and wherein the second lenses of the plurality of second lenses are uniformly arranged.

18. The phosphor plate of claim 17, wherein the plurality of first lenses and the plurality of second lenses are disposed corresponding to each other.

19. The lighting device of claim 10, wherein the first fluorescent material is a yellow fluorescent material, the second fluorescent material is a green fluorescent material, and the third fluorescent material is a red fluorescent material.

20. The lighting device of claim 10, wherein the phosphor plate further comprises a second lens disposed on the other surface of the base plate and including a fourth fluorescent material, wherein the second fluorescent layer buries a portion of the second lens.

* * * * *